US011682850B2

(12) United States Patent
Williams et al.

(10) Patent No.: US 11,682,850 B2
(45) Date of Patent: Jun. 20, 2023

(54) CRIMP TERMINAL

(71) Applicant: Optimal Ventures LLC, Arlington Heights, IL (US)

(72) Inventors: Daniel J. Williams, Wood Dale, IL (US); Rafael Belfiore Conde Ramalho, Sycamore, IL (US); Stephen M. Oshgan, Des Plaines, IL (US); Walt Sedlacek, West Chicago, IL (US); Mark Weindling, Barrington, IL (US)

(73) Assignee: Optimal Ventures, LLC, Arlington Heights, IL (US)

( * ) Notice: Subject to any disclaimer, the term of this patent is extended or adjusted under 35 U.S.C. 154(b) by 3 days.

(21) Appl. No.: 17/379,481

(22) Filed: Jul. 19, 2021

(65) Prior Publication Data

US 2021/0351522 A1 Nov. 11, 2021

Related U.S. Application Data

(62) Division of application No. 16/265,527, filed on Feb. 1, 2019, now Pat. No. 11,101,577.

(60) Provisional application No. 62/625,573, filed on Feb. 2, 2018.

(51) Int. Cl.

| | |
|---|---|
| ***H01R 43/042*** | (2006.01) |
| ***B23P 19/00*** | (2006.01) |
| ***H01R 4/20*** | (2006.01) |
| ***H01R 4/18*** | (2006.01) |
| ***H01R 43/048*** | (2006.01) |
| *H01R 13/187* | (2006.01) |

(52) U.S. Cl.

CPC ............. *H01R 4/203* (2013.01); *H01R 4/183* (2013.01); *H01R 43/0484* (2013.01); *H01R 13/187* (2013.01)

(58) Field of Classification Search

CPC .... H01R 4/183; H01R 4/203; H01R 43/0484; H01R 13/187

See application file for complete search history.

(56) References Cited

U.S. PATENT DOCUMENTS

| | | | | |
|---|---|---|---|---|
| 3,955,044 A * | 5/1976 | Hoffman | H01R 4/62 | 439/442 |
| 4,605,279 A * | 8/1986 | Mixon, Jr. | H01R 43/16 | 72/404 |
| 7,306,495 B2 * | 12/2007 | Hashimoto | H01R 4/185 | 439/877 |

(Continued)

*Primary Examiner* — Paul D Kim

(74) *Attorney, Agent, or Firm* — Bishop, Diehl & Lee, Ltd.

(57) ABSTRACT

An electric connector terminal assembly which allows numerous different terminal connector ends and wire diameters to be connected to a single size and type crimp cylinder using an rolled metal strip insert. Preferably, the metal strip is made of copper, and preferably the copper strip is coated with tin. The metal strip is then formed into a cylinder for insertion to the crimp cylinder. A method for connecting a crimp terminal to an electric wire is also disclosed. The method requires cutting a metal strip to form a plurality of parallel compliant members (e.g., fingers) connected to a base, rolling the cut strip to form a cylindrical insert, positioning the insert within a crimp cylinder of an electric connector with the fingers extending toward the mating end, inserting an electric wire within the cylindrical insert, and crimping the crimp cylinder to secure the electric wire within the cylindrical insert and crimp cylinder.

10 Claims, 11 Drawing Sheets

(56) References Cited

U.S. PATENT DOCUMENTS 8,519,267 B2 * 8/2013 Peters .................... H01R 4/203
174/79

* cited by examiner

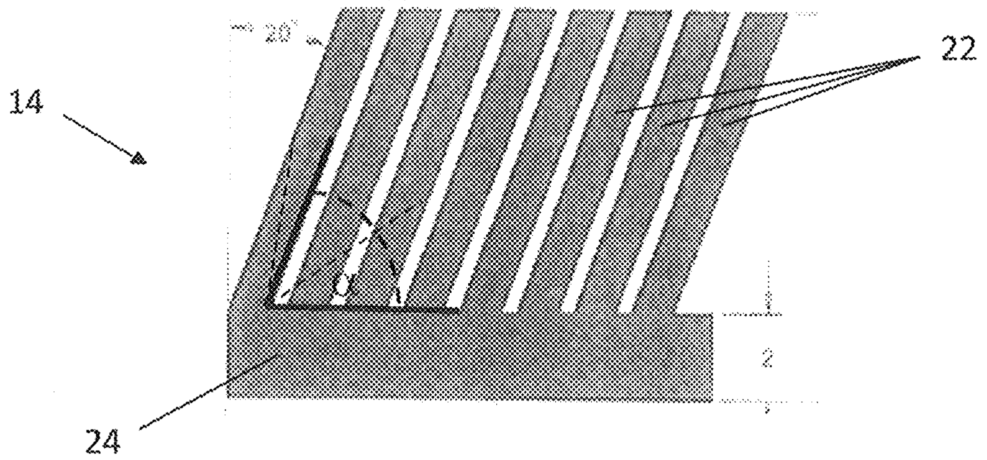
FIG. 4
FIG. 5
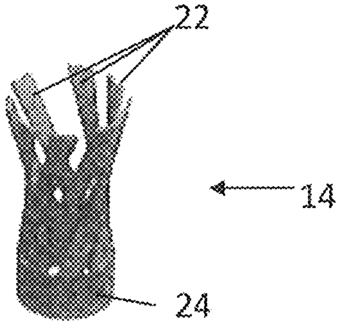
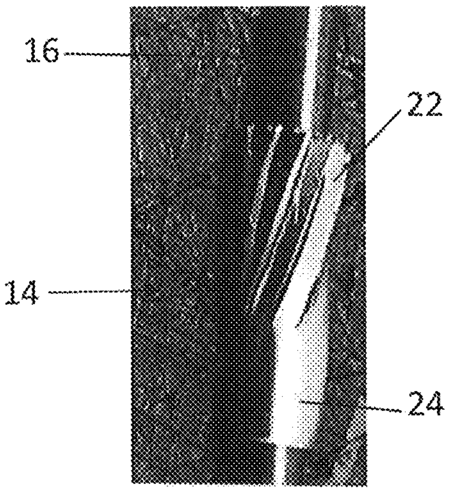
FIG. 6

Terminal Ring Small Assy

Disconnect Male Assy

Disconnect Female Assy

Spade Medium Assy

Bullet Male Assy

Bullet Female Assy

12

CRIMP TERMINAL

RELATED APPLICATION

The present application claims the filing priority of U.S. Non-Provisional Ser. No. 16/265,527, filed Feb. 1, 2019, now U.S. Pat. No. 11,101,577, which claims priority to U.S. Provisional Application No. 62/625,573 titled "Crimp Terminal" and filed on Feb. 2, 2018. The '527 and '573 applications are hereby incorporated by reference in its entirety.

TECHNICAL FIELD OF THE INVENTION

The present invention relates to an electrical terminal crimping structure. More particularly, the present invention relates to a universal crimp terminal having an inner sleeve that allows an end user to use almost any crimp connector on a wide range of wire sizes.

BACKGROUND OF THE INVENTION

When electrical wires or conductors are joined together by crimping, it is important these connections are strong and remain tight, leaving no gaps or air pockets. It is therefore essential that the correct connector size is selected for any given electrical wire or conductor. Currently, the industry requires an end user to use a wide range of crimp terminals with a wide range of wire sizes. For instance, 22 AWG wires to 10 AWG wires would require at least three different crimp terminal sizes. Thus, there is a need for a single, universal crimp terminal that can be used with a wide range of wire sizes.

Electrical wires or conductors can be joined by crimping wires together to an electrical terminal. Crimping refers to mechanically joining, or cold-welding, wires to a piece of metal by deforming one or both and securing them to one another. The deformity pinches the wire to hold it in place resulting in a crimp. To achieve a successful crimp, it is critical that no gaps or air pockets are formed which could result in a build-up of moisture and ultimately lead to corrosion and ultimately breakage of the wire. Crimping tools are necessary to apply the appropriate force to pinch the barrel of a connector and secure the wire in place.

Currently available terminals come in a variety of shapes and sizes, as shown in FIGS. 1 and 15. There are literally hundreds of options for a user when selecting the right size and form crimp terminal. Failure to select the correct crimp profile that is compatible with a wire could result in a weak crimp. It is therefore desirable to have a universal crimp terminal that can be used with a wide range of wire sizes without compromising any performance features.

These and other problems of the prior art, as well as other desired goals of a universal crimp terminal, are addressed by the invention of this application.

SUMMARY OF THE INVENTION

There is disclosed herein an improved crimp terminal, assembly and method which avoid the disadvantages of prior devices and methods while affording additional structural and operating advantages. Specifically, the disclosed assembly allows a variety of different electric terminals and electric wire sizes to be used with a single size and style crimp cylinder.

Generally speaking, the disclosed crimp terminal assembly comprises an electric terminal having a crimp cylinder and a mating end, and an insert comprising a plurality of compliant members (e.g., fingers) connected in parallel at a base. The insert is positioned within an interior surface of the crimp cylinder such that the fingers extend toward the mating end of the electric terminal.

In a specific embodiment, the insert is comprised of a metal strip. Preferably, the metal strip is comprised of copper, and preferably the copper strip is coated with tin. The metal strip is then formed into a cylinder for insertion to the crimp cylinder.

Further, a method for connecting a crimp terminal to an electric wire is also disclosed. Generally speaking, the method comprises the steps of cutting a metal strip to form a plurality of parallel fingers connected to a base, rolling the cut metal strip to form a cylindrical insert, positioning the cylindrical insert within a crimp cylinder of an electric connector having a mating end, wherein the fingers extend toward the mating end, inserting an electric wire within the cylindrical insert while positioned within the crimp cylinder, and crimping the crimp cylinder to secure the electric wire within the cylindrical insert and crimp cylinder.

In a specific embodiment of the method, the parallel fingers are cut at an acute angle to the base. Preferably, the acute angle is within the range of from about 40° to about 80°. More preferably, the acute angle is within the range of from about 65° to about 75°. Most preferably, the acute angle is about 70°.

These and other aspects of the invention may be understood more readily from the following description and the appended drawings.

BRIEF DESCRIPTION OF DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

FIG. 4 is a front view of an embodiment of the disclosed inner sleeve as an unrolled cut metal strip;

FIG. 5 is a perspective view of an embodiment of the disclosed inner sleeve rolled for use with a crimp terminal;

FIG. 6 is a side view of an embodiment of the inner sleeve wrapped around a large gauge wire;

DETAILED DESCRIPTION OF PREFERRED EMBODIMENT(S)

Figure 1:
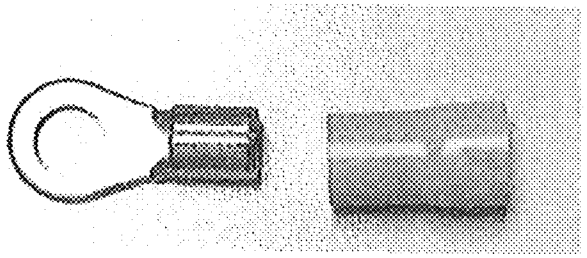
FIG. 1 (Prior Art)
FIG. 1 is a top view of a standard prior art crimp terminal.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Figure 2:
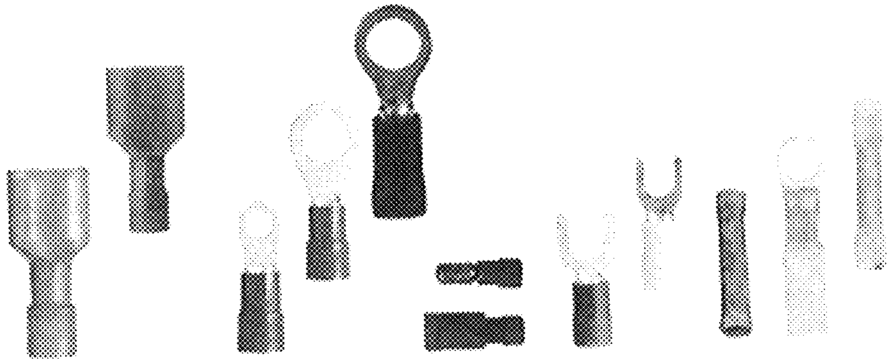
FIG. 2 (Prior Art)
FIG. 2 illustrates a collection of prior art crimp terminals having different mating ends extending from an insulative sleeve.
Figure 3:
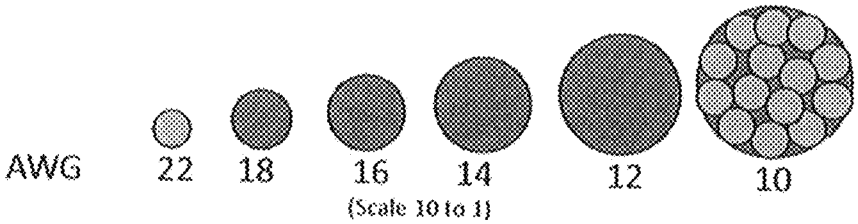
FIG. 3 is an illustration of relative wire sizes from 22 AWG to 10 AWG compatible with the present invention.
Figure 7:
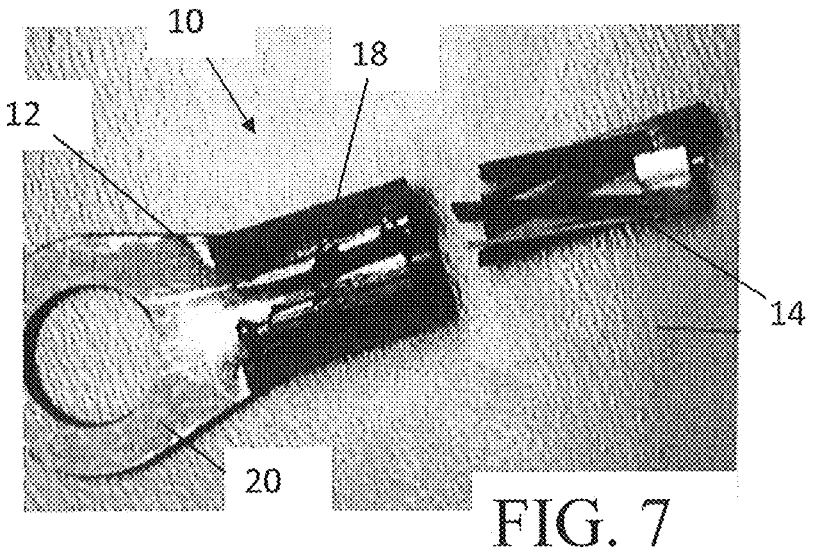
FIG. 7 is a top view of a crimp terminal and an embodiment of the disclosed inner sleeve to be inserted within the crimp cylinder of the terminal.

As shown in FIGS. 1 and 2, electric crimp terminals come with a variety of mating ends. These terminals are well-known in the art and most are compatible with the invention disclosed herein. While the mating ends 20 of these terminals may vary, the crimp cylinder 18 of each is substantially similar. Further, as illustrated in FIG. 3, electric wire, whether solid or braided, varies widely as to diameter. The present invention is usable with wire having a gauge within 10 AWG to 22 AWG—the illustrated sizes being relative and not an actual representation of the specific gauge sizes.

Referring to FIGS. 4-27, there is illustrated a crimp terminal assembly, generally designated by numeral 10, and its components. As depicted in FIGS. 4-6, the inner sleeve 14 has a plurality of compliant members, such as fingers 22, cut into a metal strip and extending in parallel from a base 24. The inner sleeve 14 is configured to fit securely within a cavity of the crimp cylinder 18. As can be seen best in FIGS. 7-10, the crimp terminal assembly 10 generally includes an electric terminal 12 and inner sleeve 14 which is adapted to receive an electric wire 16. The electric terminal 12 has a crimp cylinder 18 at one end and a mating end 20 at an opposite end.

Many factors contribute to achieving a successful crimp, but perhaps most critical is positioning a wire 16 within a properly sized crimp cylinder 18 and securing its position for the final crimp. The wire 16 must be secured to the crimp terminal 10 in a manner such that after crimping is complete, the crimped wire 16 has sufficiently high pullout strength without compromising conductivity of the connection.

It is a unique feature of the assembly 10 that any electrical wire 16, solid or braided, ranging in size from about 22 AWG to about 10 AWG (i.e., a wire diameter of about 0.025 inch to 0.102 inch) may be used. Modifications to the assembly 10 may be required to accommodate wires having a diameter greater than 10 AWG or smaller than 22 AWG. These electrical wires and their compositions are well-known to those of skill in the art.

Figure 25:
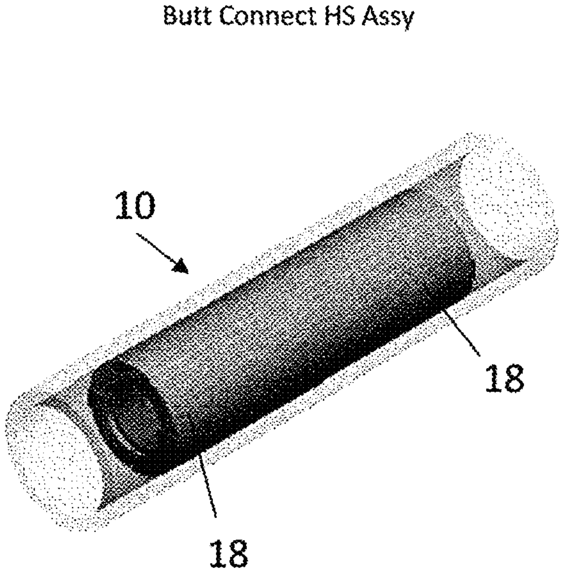
FIG. 25 is an isometric view of an embodiment of a crimp terminal assembly with dual wire mating ends.
Figure 26:
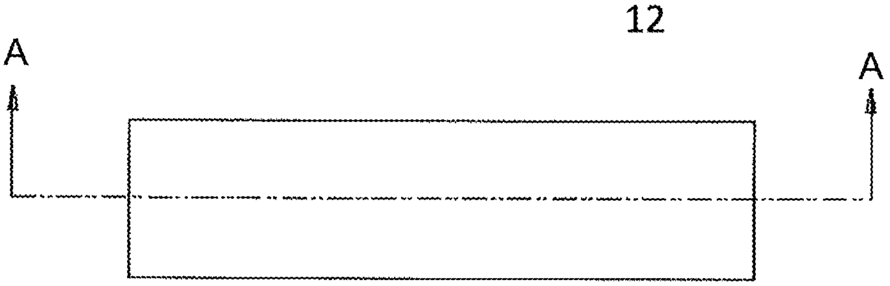
FIG. 26 is a side view of the crimp terminal of FIG. 25.
Figure 27:
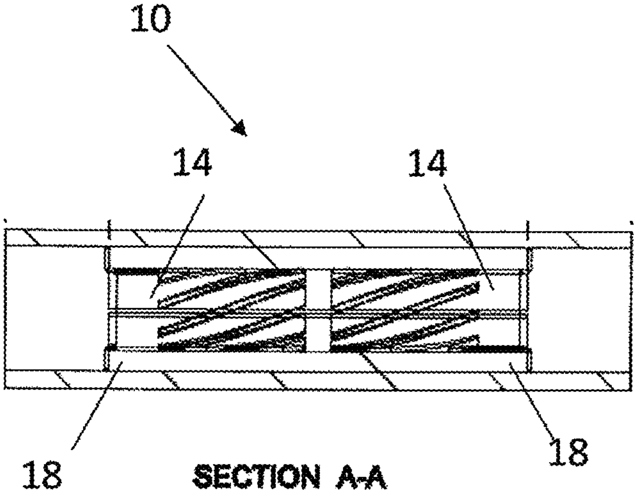
FIG. 27 is a cross-section along line A-A of FIG. 26 showing fingers of rolled inner sleeves extending from each crimp cylinder.

Likewise, it is a unique feature of the disclosed assembly 10 that terminal mating ends of almost any type can be used. As shown in FIGS. 11-27, the mating end 20 includes, but is not limited to disconnect (male and female) ends, ring shaped ends, snap ends, spade ends, splice ends, HS ring ends, HS splice ends, and dual wire connector ends (FIGS. 25-27). As previously noted, while the mating ends of these components are very different, the crimp cylinder 18 used by each is substantially identical. The electric terminal 12 is typically punched from sheet metal having a thickness greater than 0.50 mm. The material used may be copper or brass with tin plating. As these components and their uses are well-known to those of skill in the art, they are not discussed further herein.

Figure 8:
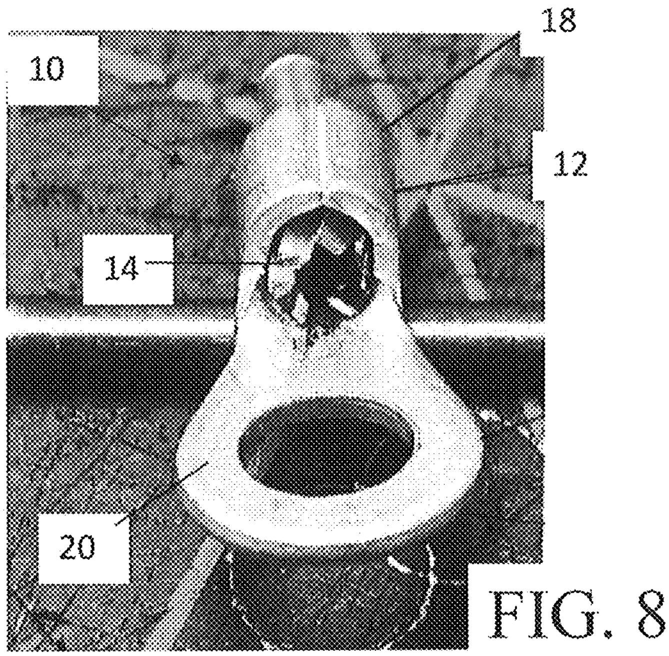
FIG. 8 is a top longitudinal view of a crimp terminal assembly and an embodiment of the disclosed inner sleeve inserted within the crimp cylinder.
Figure 9:
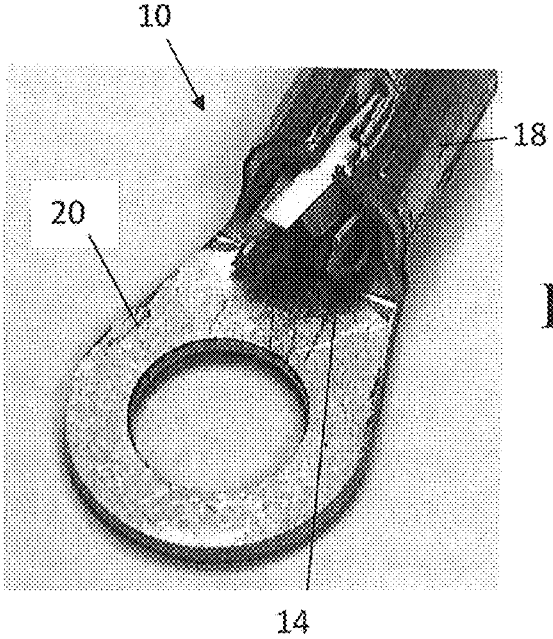
FIG. 9 is another view of an embodiment of a crimp terminal assembly with the disclosed inner sleeve within the crimp cylinder.
Figure 10:
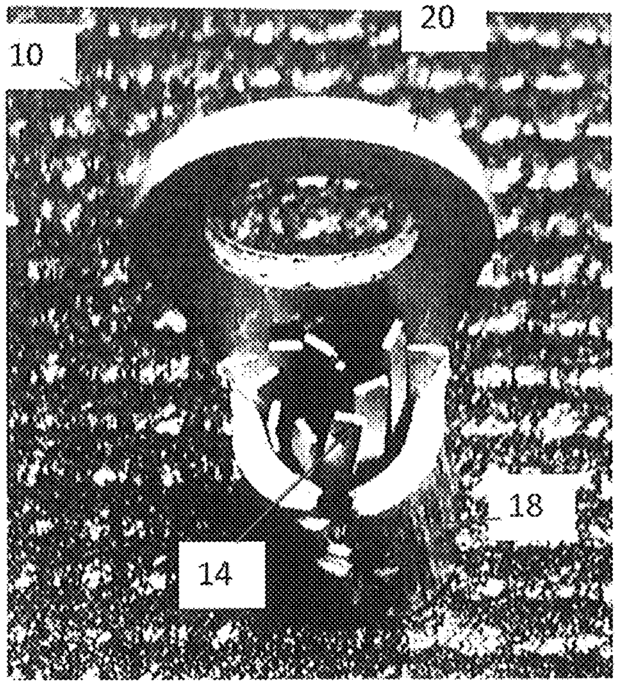
FIG. 10 is still another top view of a crimp terminal assembly with an inserted inner sleeve.
Figure 11:
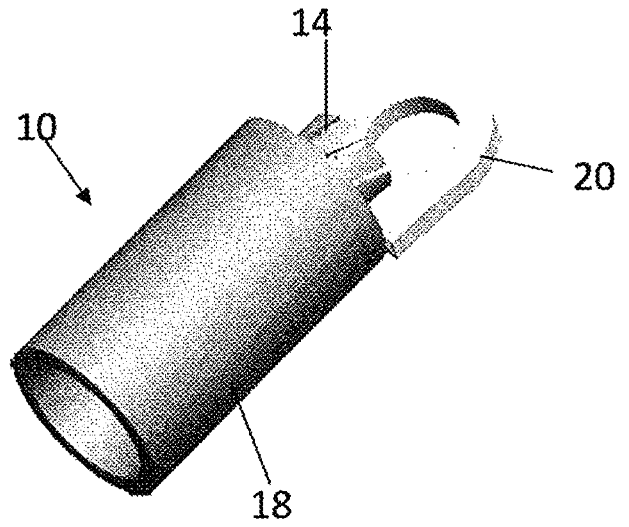
FIG. 11 is an isometric view of an embodiment of a crimp terminal assembly with a ring mating end and fingers of a rolled inner sleeve extending from the crimp cylinder.
Figure 12:
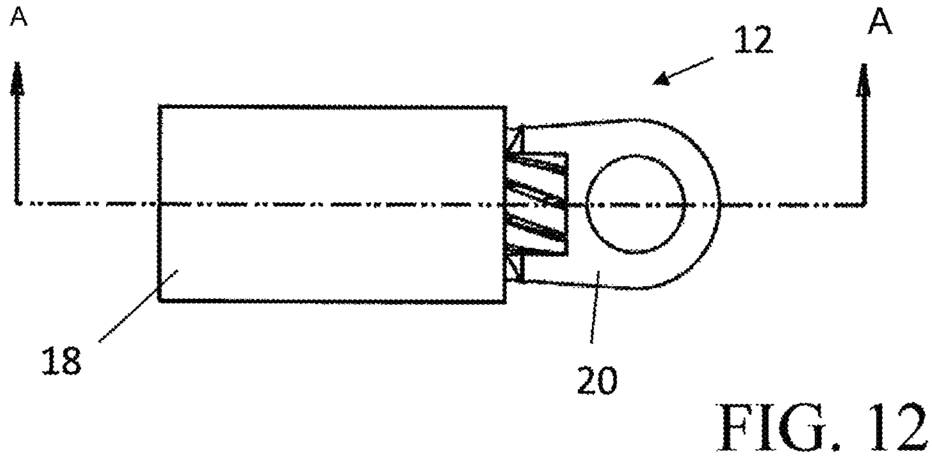
FIG. 12 is a side view of the crimp terminal of FIG. 11.
Figure 13:
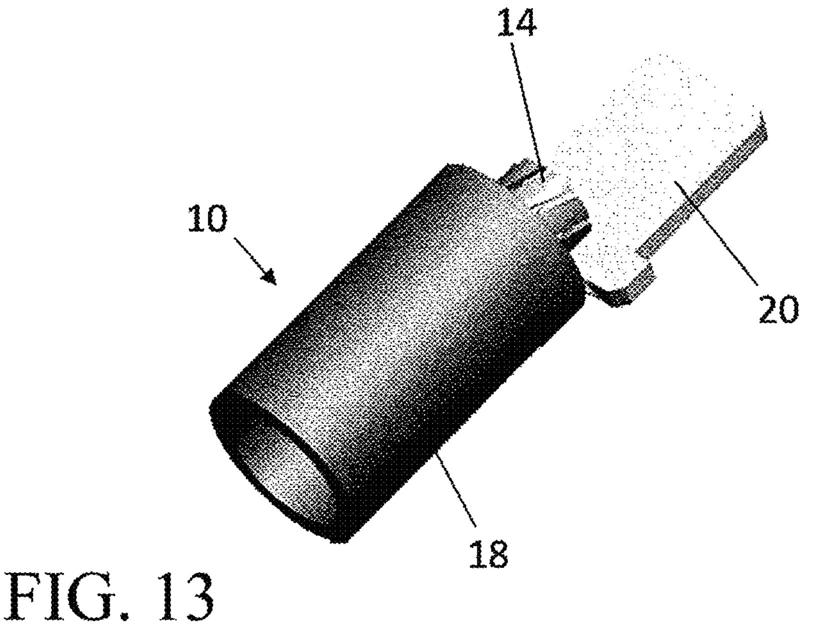
FIG. 13 is an isometric view of an embodiment of a crimp terminal assembly with a male spade mating end and fingers of a rolled inner sleeve extending from the crimp cylinder.
Figure 14:
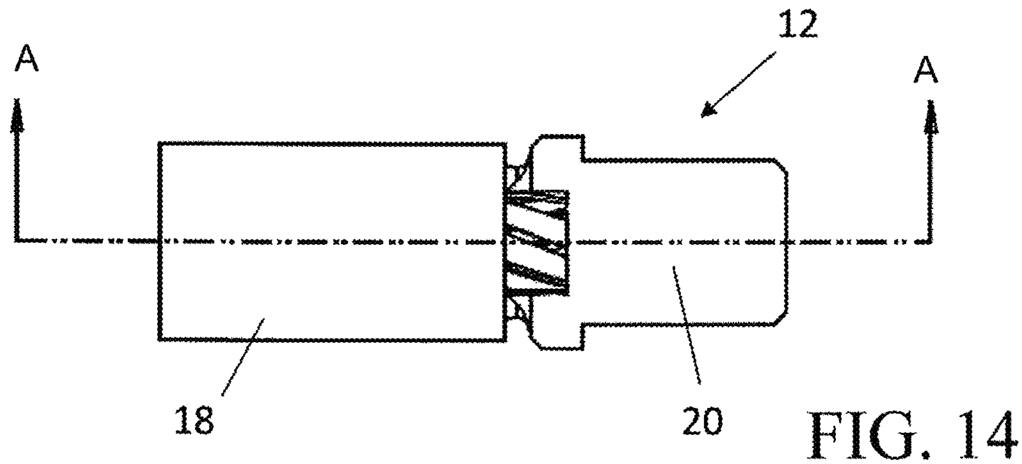
FIG. 14 is a side view of the crimp terminal of FIG. 13.
Figure 15:
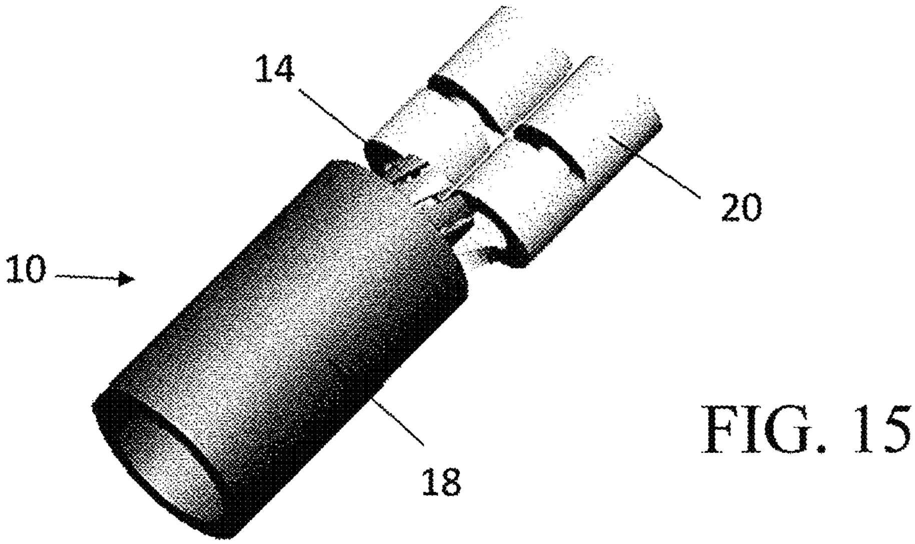
FIG. 15 is an isometric view of an embodiment of a crimp terminal assembly with a female disconnect mating end and fingers of a rolled inner sleeve extending from the crimp cylinder.
Figure 16:
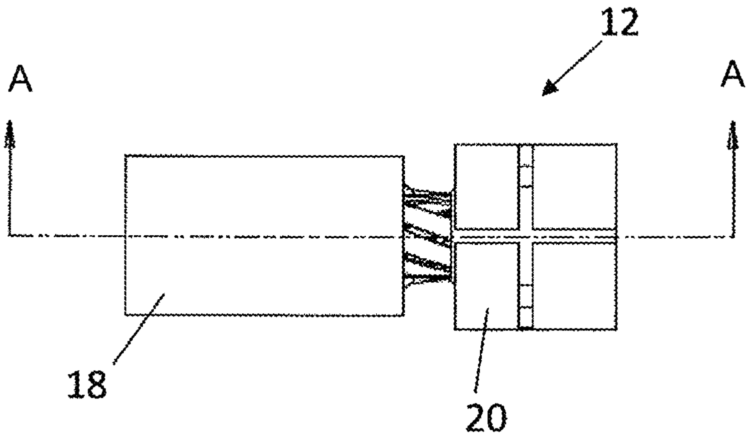
FIG. 16 is a side view of the crimp terminal of FIG. 15.
Figure 17:
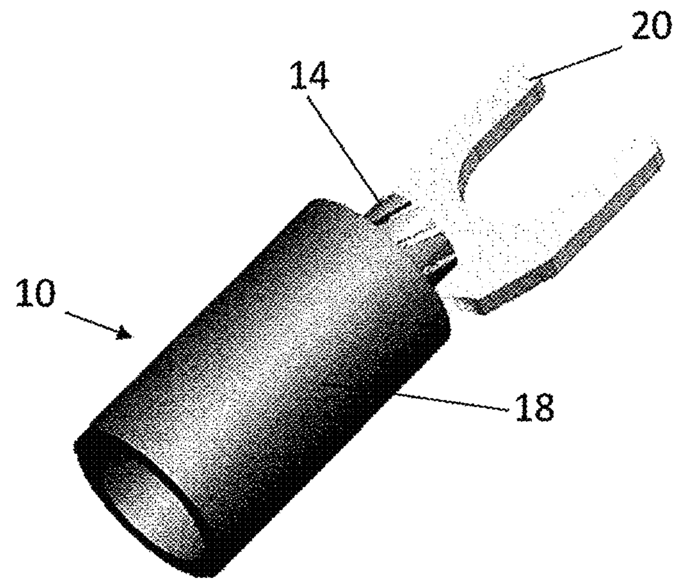
FIG. 17 is an isometric view of an embodiment of a crimp terminal assembly with a two prong mating end and fingers of a rolled inner sleeve extending from the crimp cylinder.
Figure 18:
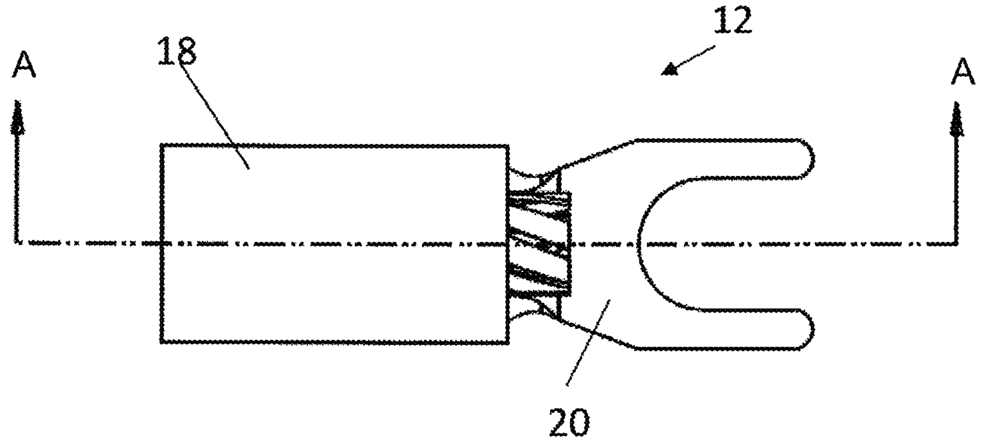
FIG. 18 is a side view of the crimp terminal of FIG. 17.
Figure 19:
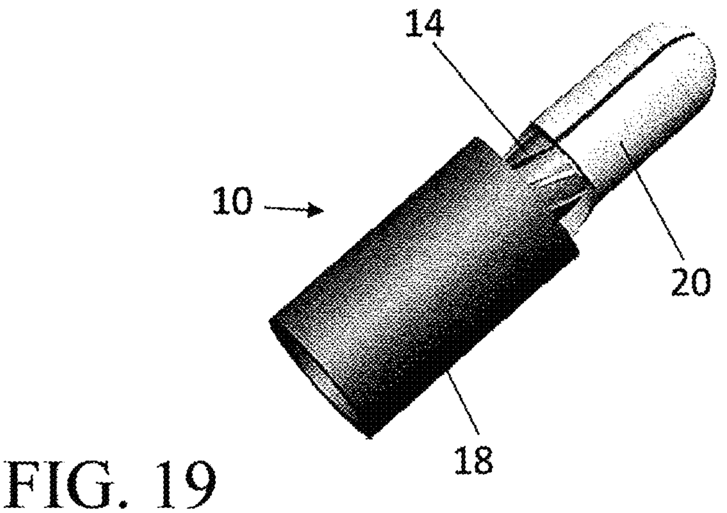
FIG. 19 is an isometric view of an embodiment of a crimp terminal assembly with a bullet male mating end and fingers of a rolled inner sleeve extending from the crimp cylinder.
Figure 20:
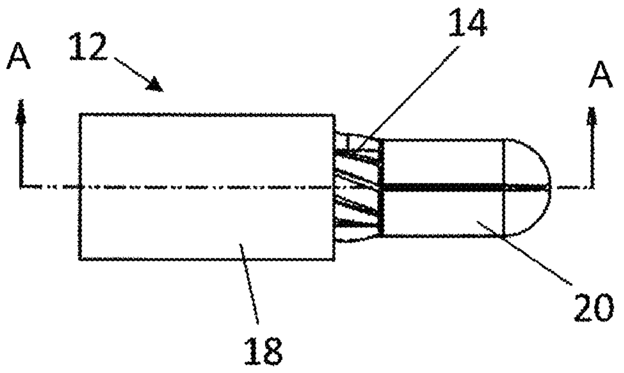
FIG. 20 is a side view of the crimp terminal of FIG. 19.
Figure 21:
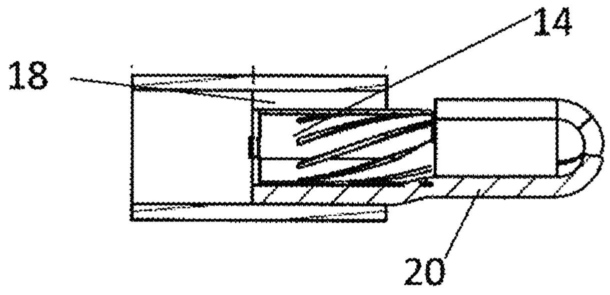
FIG. 21 is a cross-section along line A-A of FIG. 20.
Figure 22:
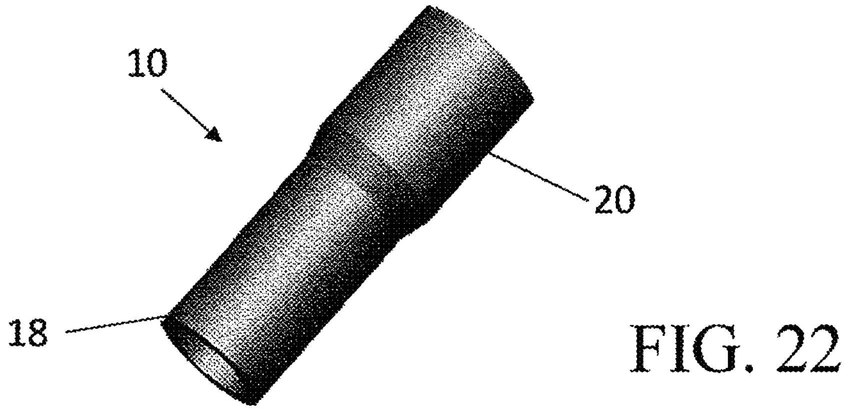
FIG. 22 is an isometric view of an embodiment of a crimp terminal assembly with a bullet female mating end.
Figure 23:
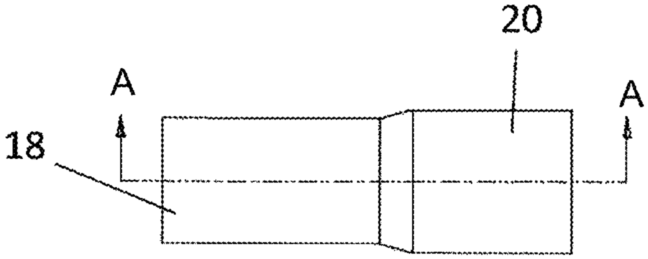
FIG. 23 is a side view of the crimp terminal of FIG. 22.
Figure 24:
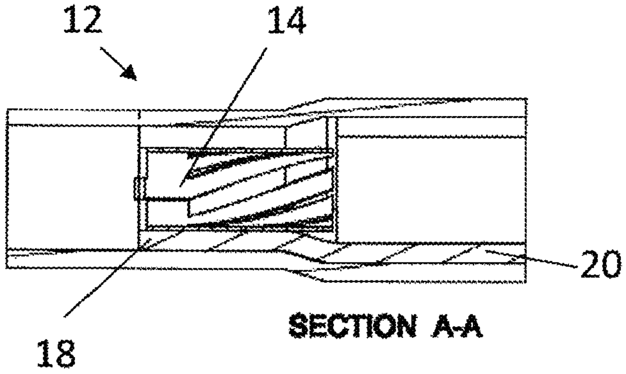
FIG. 24 is a cross-section along line A-A of FIG. 23 showing fingers of a rolled inner sleeve extending from the crimp cylinder.

As shown in FIGS. 8-10, the inner sleeve 14 fits securely within a cavity defined by the crimp cylinder 18. The insertion of the sleeve 14 to the crimp cylinder 18 can be done at initial manufacture (e.g., by a machine), as a later add on, or even by an end user, when necessary. Preferably, the inner sleeve 14 is comprised of copper strip having a thickness of approximately 0.20 mm with tin plating. The strip is cut to form parallel compliant members, such as fingers 22. As illustrated in FIG. 4, the fingers 22 are preferably cut at an angle ($\alpha$) in the range of about 40° to about 80° (broken lines), as measured from the base 24. More preferably, the angle is in the range of from about 65° to about 75°, and most preferably the angle is about 70° (solid line), as measured from the base 24.

Each of the fingers 22 function and bend as independent members because their ends are free floating. Accordingly, the fingers 22 bend in whichever direction they are pushed. Since the fingers 22 are "spiraled" as a result of the angle cut, they overlap each other as the strip is rolled for positioning inside the barrel of the crimp cylinder 18. As the fingers 22 are pushed, they tend to force each other inward inside the cylinder thus trapping small wires toward the center of the cylinder 18.

Referring again to FIGS. 5-10, the fingers 22 slightly overlap once rolled and placed inside the cylinder 18. For this reason they tend to have a slight inward bias—bending slightly inward. Similarly, as they are flexible and act as independent members, if a thicker wire is pushed in, the fingers 22 will flex outward to allow the wire to be pushed in. However, because the fingers 22 have the spiral arch configuration, they will trap the wire and bind it if a pullout force is applied. The flexibility of the fingers 22 allows them to flex "open" to accommodate larger wire sizes as well as flex inward when a crimping force is applied to force smaller wires into an optimal position for final crimp.

In operation, once the electrical wire 16 is prepared for crimping—i.e., stripped of the insulative covering—it is inserted into the opening of the crimp cylinder 18 and the housed inner sleeve 14 as well. A crimping tool, known to those of skill in the art, is then used to apply adequate force to squeeze the electric terminal 12 of the crimp terminal assembly 10 to pinch and flatten the cylinder 18. As the electric terminal 12 is squeezed inward, it applies a force on the inner sleeve 14 causing the plurality of fingers 22 located along the edge of the inner sleeve 14 to bend inward and push smaller gauge wires inward toward the center of the crimp terminal 10. As additional crimping force is applied, the electric terminal 12 of the crimp terminal assembly 10 bends inward and secures the wire 16 in the terminal 10.

The electric terminal 12 of the crimp assembly 10 is the part that provides the final crimp strength or gripping force. The primary function of the inner sleeve 14 is to bias the range of wires into an optimal crimping position. The inner sleeve 14 and electric terminal 12 may or may not be made out of the same material. For example, in one embodiment the electric terminal 12 could be tin coated brass, while the inner sleeve 14 is tin coated copper.

The present invention contemplates offering any shaped crimp form but having a common crimp cylinder 18 and inner sleeve 14 that could be used with each form 20.

FIGS. 3 and 11-27 show the benefits of having universal crimp terminal 10 that could be used with any sized wire. Currently available crimp methods cover three separate sized crimp connectors—1) AWG 22-18 (red); 2) AWG 16-14 (blue); and 3) AWG 12-10 (yellow). The present invention eliminates the need for three different size connectors and allows for the use of a universal connector. This is important because, as shown in FIG. 2, there is a large selection of crimp forms available for a user. By providing a single universal crimp cylinder 18 having an inner sleeve 14 that could be manufactured with a variety of crimp forms, it eliminates having to select the correct size connector.

The present invention is capable of embodiments in many different forms. Preferred embodiments of the invention are disclosed with the understanding that the present disclosure is to be considered an exemplification of the principles of the invention and are not intended to limit the broad aspects of the invention to the embodiments illustrated.

Certain modifications and improvements will occur to those skilled in the art upon a reading of the foregoing description. The above-mentioned examples are provided to serve the purpose of clarifying aspects of the invention and will be apparent to one skilled in the art that they do not serve to limit the scope of the invention. All modifications and improvements have been deleted herein for the sake of conciseness and readability but are properly within the scope of the following claims.

What is claimed is:

1. A crimp terminal assembly comprising:

an electric terminal having a crimp cylinder and a mating end; and an insert comprising a metal strip having a plurality of compliant members connected in parallel at a base;

wherein the insert is positioned within an interior surface of the crimp cylinder and the compliant members extend toward the mating end of the electric terminal.

2. The crimp terminal assembly of claim 1, wherein the metal strip is comprised of copper.

3. The crimp terminal assembly of claim 2, wherein the copper strip is coated with tin.

4. The crimp terminal assembly of claim 1, wherein the mating end is selected from the group consisting of male disconnect end, female disconnect end, ring shaped end, snap end, spade end, splice end, HS ring end and HS splice end.

5. The crimp terminal assembly of claim 1, wherein the metal strip is formed into a cylinder.

6. The crimp terminal assembly of claim 5, wherein the compliant members of the insert overlap one another in cylinder form.

7. The crimp terminal assembly of claim 1, wherein the compliant members are cut into the metal strip at an acute angle relative to the base.

8. The crimp terminal assembly of claim 7, wherein the acute angle is within the range of from about 40° to about 80°.

9. The crimp terminal assembly of claim 8, wherein the acute angle is within the range of from about 65° to about 75°.

10. The crimp terminal assembly of claim 9, wherein the acute angle is about 70°.

* * * * *